(12) United States Patent
Wanzenböck et al.

(10) Patent No.: US 7,407,430 B1
(45) Date of Patent: Aug. 5, 2008

(54) ADJUSTABLE FRONT CLOSURE FOR BRA OR BIKINI TOP

(75) Inventors: Karl Wanzenböck, Leobersdorf (AT); Hans Habarda, Vienna (AT); Gerhard Fildan, Vienna (AT)

(73) Assignee: Fildan Accessories Corporation, Humble, TX (US)

( * ) Notice: Subject to any disclaimer, the term of this patent is extended or adjusted under 35 U.S.C. 154(b) by 0 days.

(21) Appl. No.: 11/823,851

(22) Filed: Jun. 27, 2007

(51) Int. Cl.
*A41C 3/10* (2006.01)
*A41C 3/12* (2006.01)

(52) U.S. Cl. .............................. 450/63; 450/79; 450/82; 24/116 A; 24/134 P; 2/67

(58) Field of Classification Search ............... 450/1, 450/58, 59, 62–64, 67–69, 78, 79, 82, 17, 450/18, 23, 25, 26, 28; 2/67, 69, 73, 78.1–78.3, 2/105, 106, 96, 336, 338, 321, 322; 24/116 A, 24/134 P, 115 H
See application file for complete search history.

(56) References Cited

U.S. PATENT DOCUMENTS

| | | | | |
|---|---|---|---|---|
| 1,727,687 A | * | 9/1929 | Agobian | 24/134 P |
| 2,637,884 A | * | 5/1953 | Morehouse | 24/336 |
| 3,225,565 A | * | 12/1965 | Bohlinger et al. | 63/3.2 |
| 6,189,186 B1 | * | 2/2001 | Boden | 24/129 R |
| 6,386,944 B2 | * | 5/2002 | Keith et al. | 450/1 |
| 6,390,884 B1 | * | 5/2002 | Dragojevic | 450/1 |
| 6,994,606 B2 | * | 2/2006 | Li | 450/82 |
| 7,124,477 B2 | * | 10/2006 | Boland | 24/116 A |
| 7,267,599 B2 | * | 9/2007 | Allen et al. | 450/67 |

* cited by examiner

*Primary Examiner*—Gloria Hale
(74) *Attorney, Agent, or Firm*—Andrew Wilford

(57) ABSTRACT

A bra having a pair of cups having adjacent but spaced inner edges is provided with a front closure/adjuster that has respective flexible cords attached to the cup inner edges and each carrying a succession of spaced relatively hard pearls. A generally rigid body between the cups is formed with a pair of adjacent throughgoing passages through each of which a respective one of the pearl cords passes and along which the pearl cords can slide. Respective latch elements are each shiftable on the body relative to the respective passages between a freeing position generally clear of the respective passage and allowing the respective pearl cord to slide therein and a latching position engaging at least one pearl of the respective cord and preventing the respective pearl cord from sliding therein in at least one direction. Respective springs urge the latch elements into the respective latching positions.

13 Claims, 6 Drawing Sheets

ADJUSTABLE FRONT CLOSURE FOR BRA OR BIKINI TOP

FIELD OF THE INVENTION

The present invention relates to an adjustable front closure for a bra or bikini top. More particularly this invention concerns such a closure/adjuster that allows a user to adjust the spacing between the cups of a bra or bikini top.

BACKGROUND OF THE INVENTION

A standard bra, which term is intended to cover a bikini or halter top, is comprised of a pair of cups intended to cover and support the breasts of the wearer, a connector securing together the inner edges of the cups, and at least one strap-like back or wing that extends from outer edges of the cups around the back of the wearer. There may also be further straps that extend from upper edges of the cups over the shoulders of the wearer to attachment points on the strap crossing the wearer's back. It is also standard for the back to be provided with a hook-and-eye closure allowing it to be opened and for the length of this strap to be adjusted.

For best fit it is often considered desirable to provide a front adjuster that allows the side-to-side or horizontal spacing between the cups to be adjusted. This front adjuster can also be formed as a closure that is separable to allow the bra to be donned or removed by separation in the front between the cups, eliminating the need for the difficult-to-manipulate back closure. The simplest such front adjuster comprises respective cords attached to inner edges of the cups and extending through a cord stopper that is spring loaded to grip the cords and compressible to release them. This system has proven extremely ineffective, since it is necessary to provide a relatively large cord stopper to provide the necessary holding power, and such an item is inconvenient and unattractive, especially considering its location. What is more, such an adjuster is difficult to design so that it can function as a closure and be opened completely.

OBJECTS OF THE INVENTION

It is therefore an object of the present invention to provide an improved front bra connector serving as closure and adjuster.

Another object is the provision of such an improved front bra connector that overcomes the above-given disadvantages, in particular that is of simple, small, and attractive design, while at the same time permitting the cup spacing to be adjusted and also allowing full separation, thereby acting as a closure and as an adjuster.

A further object is to provide such a closure/adjuster that can resist considerable forces in spite of its small size, yet is easy for the wearer to adjust and that can be separated into two parts for full closure action.

Yet another object is to provide an adjustable front bra closure that allows cup spacing to be varied over a considerable range.

SUMMARY OF THE INVENTION

A bra having a pair of cups having adjacent but spaced inner edges is provided with a front adjuster that has according to the invention respective flexible cords attached to the cup inner edges and each carrying a succession of spaced relatively hard pearls. A generally rigid body between the cups is formed with a pair of adjacent throughgoing passages through each of which a respective one of the pearl cords passes and along which the pearl cords can slide. Respective latch elements are each shiftable on the body relative to the respective passages between a freeing position generally clear of the respective passage and allowing the respective pearl cord to slide therein and a latching position engaging at least one pearl of the respective cord and preventing the respective pearl cord from sliding therein in at least one direction. Respective springs urge the latch elements into the respective latching positions.

With this system therefore it is possible, because of the positive hold of the latch elements on the pearl cords, to make the front connector serving as adjuster extremely small without having to worry about unwanted slippage of the cords. In fact it is possible to make the connector into a very decorative item only some 20 mm wide and 7 mm deep that, in combination with the pearl cords, in fact enhances the appearance of the bra, while allowing it to be used even on a bra of larger cup size. The tiny connector furthermore can function as closure, with two separable halves that flank a central vertical symmetry plane and that form an extremely attractive appearance, making it suitable even for use when intended to be visible, as on a bathing-suit or halter top.

In the bra front closure/adjuster according to the invention each of the latch elements is formed partially as a button projecting from the body at least in the latching positions. The buttons project oppositely from the body in the latching positions so that pressing the buttons together shifts both of the elements into the freeing positions. This makes it extremely easy to adjust the cup spacing of the bra.

Each cord passage extends in accordance with the invention arcuately and has an upper end open horizontally and away from the upper end of the other passage and a lower end opening generally downward and generally parallel to the other lower end. Thus the user can easily grasp the dangling lower ends of the two cords and pull on them to symmetrically decrease the spacing between the cups, with the closure/adjuster staying exactly in the center. To increase spacing the two spring elements are actuated, typically by pushing their buttons toward each other, to release both cords so that they naturally slide up and allow the bra cups to separate.

Furthermore according to the invention each of the pearls has a back flank that is steep and a front flank that is relatively shallow and the pearls are oriented such that, when the respective cord is tensioned. The pearls can cam out the respective latch elements to pull the cups together. Thus the cords can be pulled to move the cups together without having to actuate the latches. Actuation is only necessary to allow the cords to slip back and increase cup spacing.

In The bra front connector according to the invention the spring are each formed as an arm unitarily formed with each of the latch elements and bearing on the body. This makes the assembly very simple and fully capable of being laundered, since the entire structure is made of plastic.

Each of the latch elements is pivoted on the body between the passages and is formed with a channel aligned with the respective passage in the freeing position and with a tooth projecting transversely into the respective passage in the latching position.

In order that the closure can be completely separated to allow the back closure to be eliminated, it has a pair of separable halves each formed with a respective one of the passages and carrying a respective one of the latch elements and of the springs. Means is provided for releasably securing the body halves together. This means can be a snap connector.

Thus one of the halves is formed with a seat and the other of the halves is formed with a tab tightly but releasably engageable in the seat.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
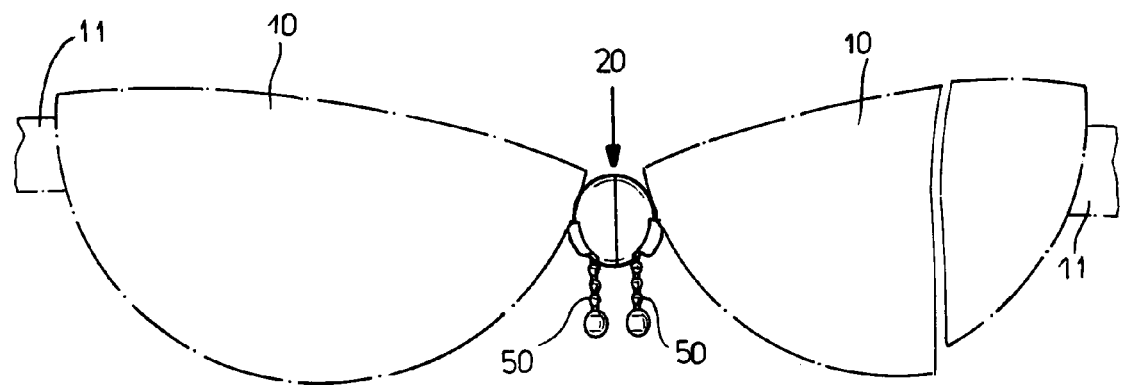
FIG. 1 is a front view of a bra with the front closure/adjuster according to the invention.
Figure 2:
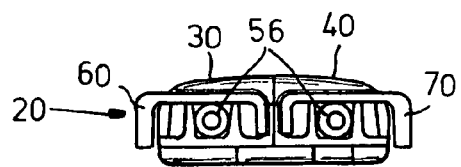
FIG. 2 is a large-scale bottom view of the closure/adjuster.

As seen in FIGS. 1 and 2 a bra has a pair of cups 10 and a strap 11 that may extend continuously around the wearer's back, without the standard-hook/eye fastener if desired. The adjacent inner edges of the cups 10 are connected together by a front closure/adjuster 20 according to the invention that is comprised of main and secondary halves 30 and 40 with respective identical pearl cords 50 extending through the closure/adjuster 20. The halves 30 and 40 have respective latch elements 60 and 70 actuatable to grip and release the respective cords 50.

The main closure half 30 also shown in FIGS. 4-17 comprises two molded parts, namely a generally semicircular base part 31 and a cover 32 that together flank and largely surround the respective latch element 60. The base part 31 is formed with an arcuate groove 33, with a pair of pins 34 and 35, and with an abutment 36. It also has a flat flange 37 formed with a pair of elongated seat holes 38, a back face of this flange 37 and of the entire base part 1 being basically flat and planar. An outer edge of the flange 37 is formed with an outwardly open notch 39. The cover 32 fits complementary over the front of the base part 31, having two holes in which the outer ends of the pins 34 and 35 seat. The latch element 60 is pivoted on the pin 34.

The secondary closure half 40 also shown in FIGS. 4-10 and 18-28 comprises two molded parts, namely a generally semicircular base part 41 and a cover 42 that together flank and largely surround the respective latch element 70. The cover 42 that constitutes the front side of the half 40 is a mirror image of the cover 32 of the half 30 so that, seen from the front, the closure/adjuster 20 is symmetrical to a vertical center plane P. The base part 41 is formed with an arcuate groove 43, with a pair of pins 44 and 45, and with an abutment 46. On its basically planar rear face, which is shaped to fit complementarily on a front face of the flange 37, the base part 41 is formed with a pair of elongated bumps or tabs 47 that are adapted to fit tightly in the holes 38 to form a tight snap fit, and with a tooth 48 that can fit complementarily in the notch 39. The respective latch element 70 is pivoted on the pin 44, and the respective cover 42 is carried on the outer front ends of the pins 44 and 45.

Figure 3:
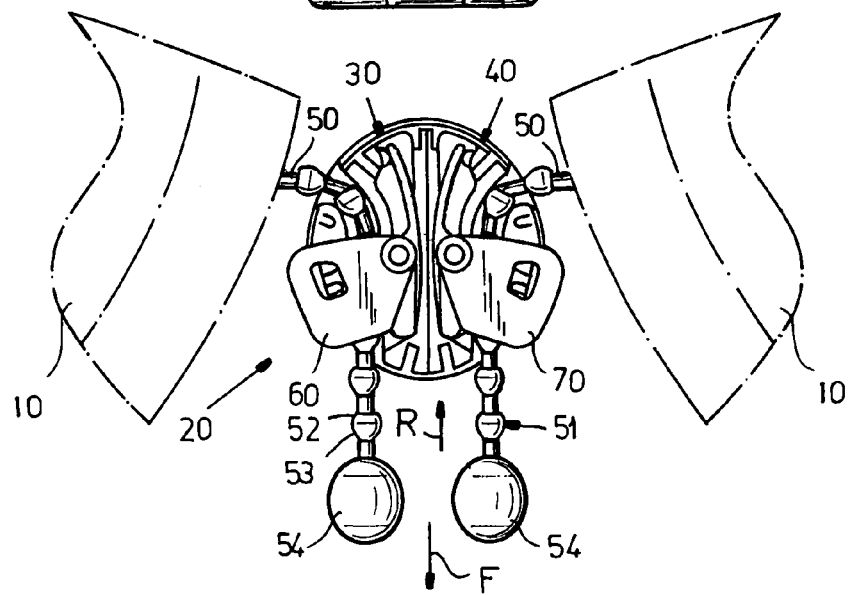
FIG. 3 is a large-scale front view of the closure/adjuster with its front cover parts removed for clarity of view.
Figure 4:
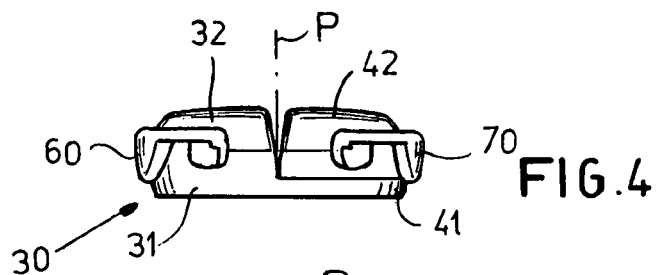
FIGS. 4 and 5 are bottom and top end views of the closure/adjuster.
Figure 10:
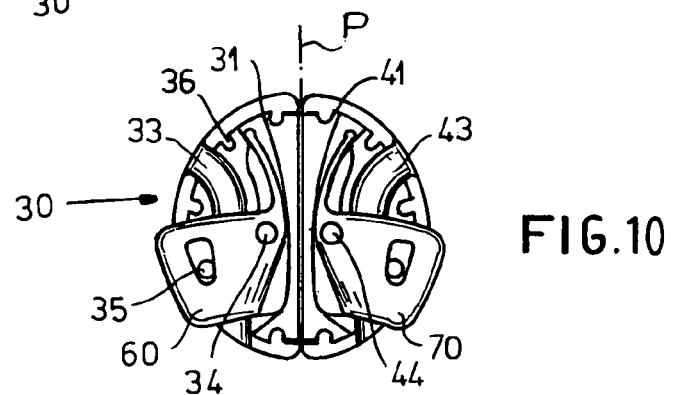
FIG. 10 is a front view of the closure/adjuster with the front cover parts removed.
Figure 8:
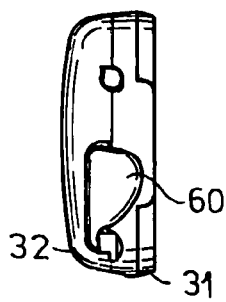
FIGS. 8 and 9 are opposite side views of the closure/adjuster.
Figure 6:
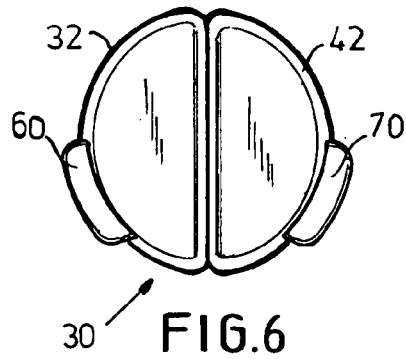
FIGS. 6 and 7 are front and back views of the closure/adjuster.
Figure 9:
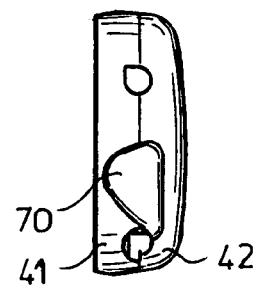
Figure 5:
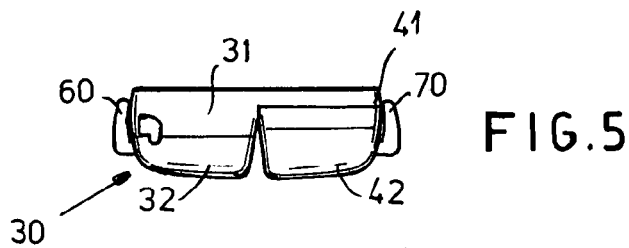
Figure 7:
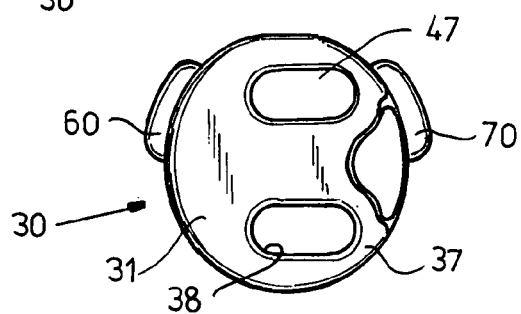
Figure 11:
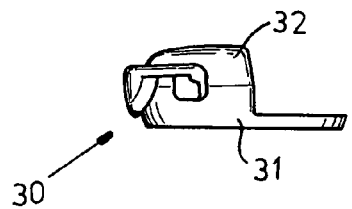
FIGS. 11 and 12 are bottom and top end views of the main half of the closure/adjuster.
Figure 17:
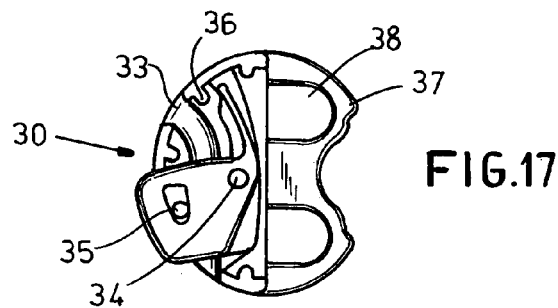
FIG. 17 is a front view of the main closure half with its cover part removed.
Figure 15:
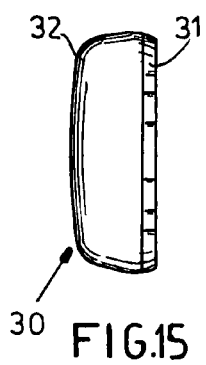
FIGS. 15 and 16 are opposite side views of the main closure half.
Figure 13:
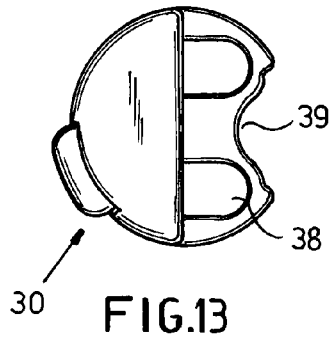
FIGS. 13 and 14 are front and back views of the main closure half.
Figure 16:
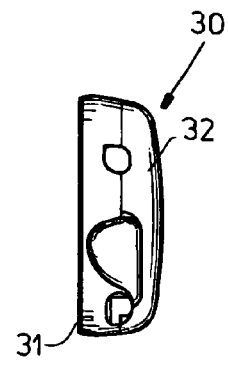
Figure 12:
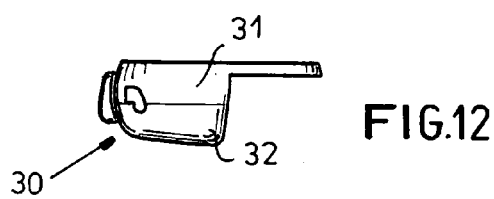
Figure 14:
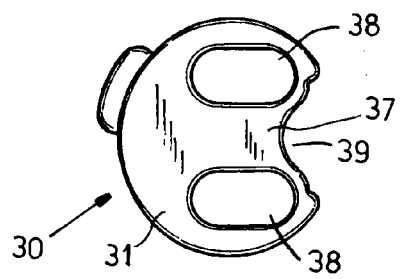
Figure 18:
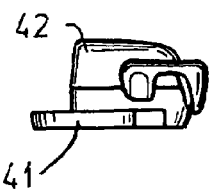
FIGS. 18 and 19 are bottom and top end views of the secondary half of the closure/adjuster.
Figure 24:
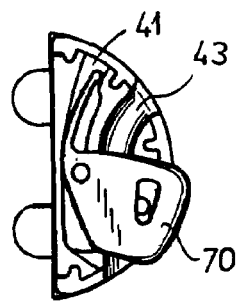
FIG. 24 is a front view of the secondary closure half with its cover part removed.
Figure 22:
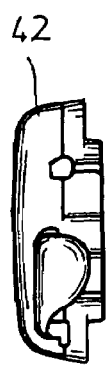
FIGS. 22 and 23 are opposite side views of the secondary closure half.
Figure 20:
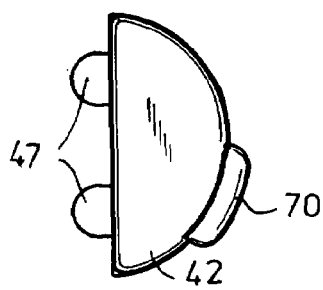
FIGS. 20 and 21 are front and back views of the secondary closure half.
Figure 23:
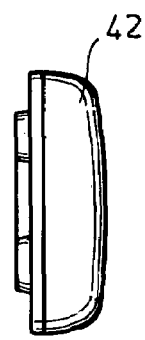
Figure 19:
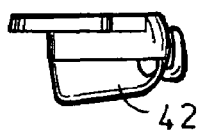
Figure 21:
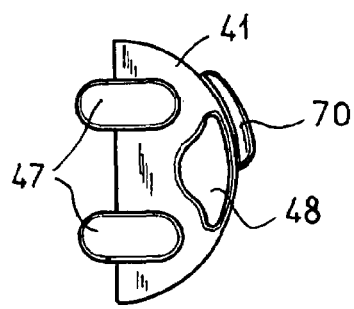
Figure 25:
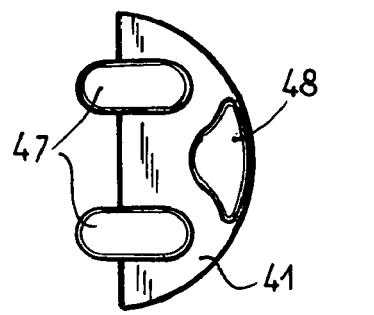
FIGS. 25 and 26 are front and back view are back and front views of the base part of the secondary closure half.
Figure 27:
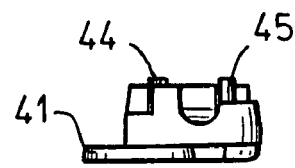
FIGS. 27 and 28 are bottom and top end views of the base part of the secondary closure half.
Figure 29:
FIGS. 29 and 30 are opposite side views of the base part of the secondary closure half.
Figure 26:
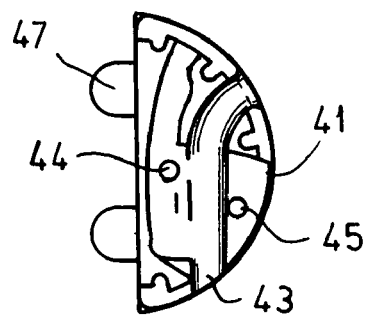
Figure 30:
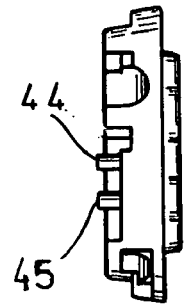
Figure 28:
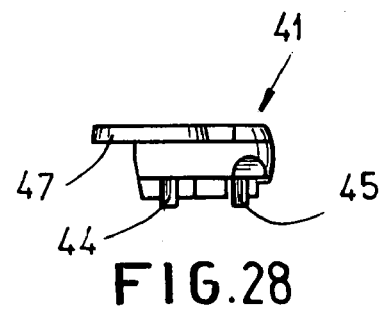
Figure 31:
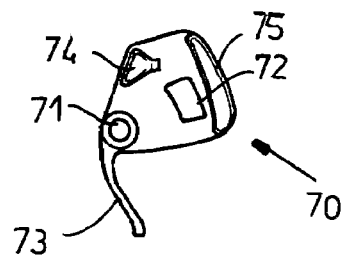
FIGS. 31 and 32 are front and back views of one of the latch elements.
Figure 35:
FIGS. 35 and 36 are bottom and top end views of the one latch element.
Figure 33:
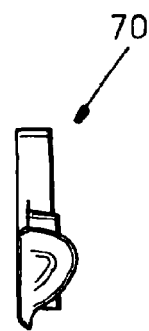
FIGS. 33 and 34 are opposite side views of the one latch element.
Figure 32:
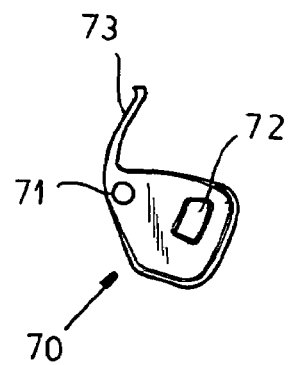
Figure 34:
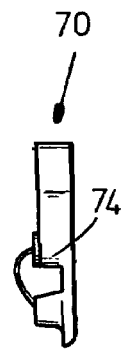
Figure 36:
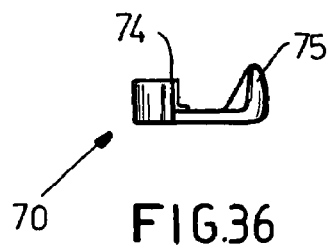

The latch element 70 shown in detail in FIGS. 31-36 is identical to but a mirror image of the latch element 60 and is made of a flexible but durable synthetic resin. It has a hole 71 adapted to fit over the respective pivot pin 44 and an arcuate slot 72 offset from and centered on the hole 71 and through which passes the pin 45. Thus this element 70 can pivot limitedly about the pivot pin 44. It is also formed offset from the hole 71 with a tooth 74 and on an outer edge to the other side of the hole 7 with an edge flange 74 forming a button and projecting out from between the respective parts 41 and 42, through a slot formed between them. The pin 44 is basically at a center of curvature of the outer edges of the parts 41 and 42 and also at the center of curvature of the edge flange 74 so that the flange 74 can move along the outer edge of the respective half 40. The element 70 also has a flexible spring arm 73 bearing on the abutment in a direction engaging the respective tooth 74 into the respective passage 43. As mentioned, the element 60 is substantially identical but a mirror image, as shown in FIG. 3, and the corresponding parts of the other half 30 are similarly oriented and shaped.

The pearl cords 50 each carry a series of so-called pearls 51 each having a steep outer flank 52 and a shallow inner flank 53, and a substantially larger bead 54 at its outer end. The cords 50 lie in the passages 33 and 43 just outward of the respective pivot pins 34 and 44. The spring arms 63 (FIG. 3) and 73 of the latch elements 60 and 70 bias them into positions with their teeth (only tooth 74 shown) bearing on the steep rear face 52 of a respective one of the pearls 51, thereby preventing the respective cords 50 from sliding in a rearward direction R (FIG. 3) allowing the cups 10 to separate. The front flanks 53 are shallow enough that if the wearer of the bar pulls on one of the beads 54, the respective cord 50 will be able to slide through the respective passage 33 or 43, with the flanks 53 camming out the respective latch element 60 or 70.

The passages 33 and 43 have upper ends that open outward away from each other and lower ends that open downward parallel to and immediately adjacent each other. Thus it is possible for the user to easily grasp the body formed by the two parts 30 and 40 between the fingers of one hand while gripping both dangling cords 50 between the fingers of the other hand and pull to decrease spacing between the cups 10, symmetrically moving them together. To increase the spacing the two element 60 and 70 are pushed together, thereby releasing the cords so they will be able to slide up and allow the cups 10 to separate.

In addition the two halves 30 and 40 can be separated by twisting them relative to each other to snap the tabs 47 out of the seat holes 38, for the desired closure function. They are joined back together by pressing them together to snap the tabs 47 into the holes 38. Other styles of connection are possible, so long as they work to form a solid coupling n the horizontal direction to resist unintended separation when the two halves 30 and 40 are pulled apart transversely of the plane P.

We claim:

1. A combination comprising:
    a brassiere having a pair of cups having adjacent but spaced inner edges at a wearer's cleavage, and a front connector at the cleavage between the cups and in turn comprising:
    respective flexible cords attached to the cup inner edges and each carrying a succession of spaced relatively hard pearls;
    a generally rigid body separate from and between the cups and formed with a pair of adjacent throughgoing passages through each of which a respective one of the pearl cords passes and along which the pearl cords can slide;
    respective latch elements each shiftable on the body relative to the respective passages between a freeing position generally clear of the respective passage and allowing the respective pearl cord to slide therein and a latching position engaging at least one pearl of the respective cord and preventing the respective pearl cord from sliding therein in at least one direction; and
    respective springs urging the latch elements into the respective latching positions.

2. The combination defined in claim 1 wherein each of the latch elements is formed partially as a button projecting from the body at least in the latching positions.

3. The combination defined in claim 2 wherein the buttons project oppositely from the body in the latching positions, whereby pressing the buttons together shifts both of the elements into the freeing positions.

4. The combination defined in claim 1 wherein each passage extends arcuately and has an upper end open horizontally and away from the upper end of the other passage and a lower end opening generally downward and generally parallel to the other lower end.

5. The combination defined in claim 1 wherein each of the pearls has a back flank that is steep and a front flank that is relatively shallow and the pearls are oriented such that, when the respective cord is tensioned, the pearls can cam out the respective latch elements to pull the cups together.

6. The combination defined in claim 1 wherein the springs are respective arms unitarily formed with the respective latch elements and bearing on the body.

7. The combination defined in claim 1 wherein each of the latch elements is pivoted on the body.

8. The combination defined in claim 7 wherein the latch elements are pivoted on the body between the passages and are each formed with a channel aligned with the respective passage in the freeing position and with a tooth projecting transversely into the respective passage in the latching position.

9. The combination defined in claim 1 wherein the body has a pair of separable body halves each formed with a respective one of the passages and each carrying a respective one of the latch elements and of the springs, the connector further comprising
    means for releasably securing the body halves together.

10. The combination defined in claim 9 wherein the means for securing is a snap connector.

11. The combination defined in claim 9 wherein one of the halves is formed with a seat and the other of the halves is formed with a tab tightly but releasably engageable in the seat.

12. The combination defined in claim 9 wherein the body halves have front sides that are symmetrically identical.

13. The combination defined in claim 12 wherein the front sides are symmetrical to a vertical symmetry plane equispaced between the cups.

\* \* \* \* \*